United States Patent [19]

O'Mary et al.

[11] 3,732,568
[45] May 8, 1973

[54] PULSE DOPPLER SIGNAL SIMULATOR

[75] Inventors: Hollis W. O'Mary, Huntsville, Ala.; James L. Morris, Farmers Branch, Tex.

[73] Assignee: The United States of America as represented by the Secretary of the Army, Washington, D.C.

[22] Filed: Sept. 8, 1970

[21] Appl. No.: 70,168

[52] U.S. Cl....................................343/17.7, 35/10.4
[51] Int. Cl................................................G01s 7/40
[58] Field of Search ........................343/17.7; 35/10.4

[56] References Cited

UNITED STATES PATENTS

| | | | |
|---|---|---|---|
| 2,824,221 | 2/1958 | Hilliard | 343/17.7 X |
| 2,953,780 | 9/1960 | Goldfischer | 343/17.7 |
| 3,162,854 | 12/1964 | Campbell | 343/17.7 |
| 3,320,349 | 5/1967 | Pollack et al. | 343/17.7 X |

Primary Examiner—Benjamin A. Borchelt
Assistant Examiner—G. E. Montone
Attorney—Harry M. Saragovitz, Edward J. Kelly and Herbert Berl

[57] ABSTRACT

A device for providing signals which may be connected to the signal processing portion of a doppler radar to test the performance of the signal processor. The device may provide any preselected clutter level or target sizes. An audio signal is supplied to stage 1. The target size, a.c. signal level, is chosen by the appropriate set of relay contacts and is connected to stage 3 via a buffer stage 2. A preselected clutter level is supplied by stage 3. The continuous target size and clutter level outputs are converted to video pulses in coincidence with the input pulses from the pulse repetition frequency (PRF) generator of the doppler radar. The video pulses are supplied to the processor of the radar.

7 Claims, 1 Drawing Figure

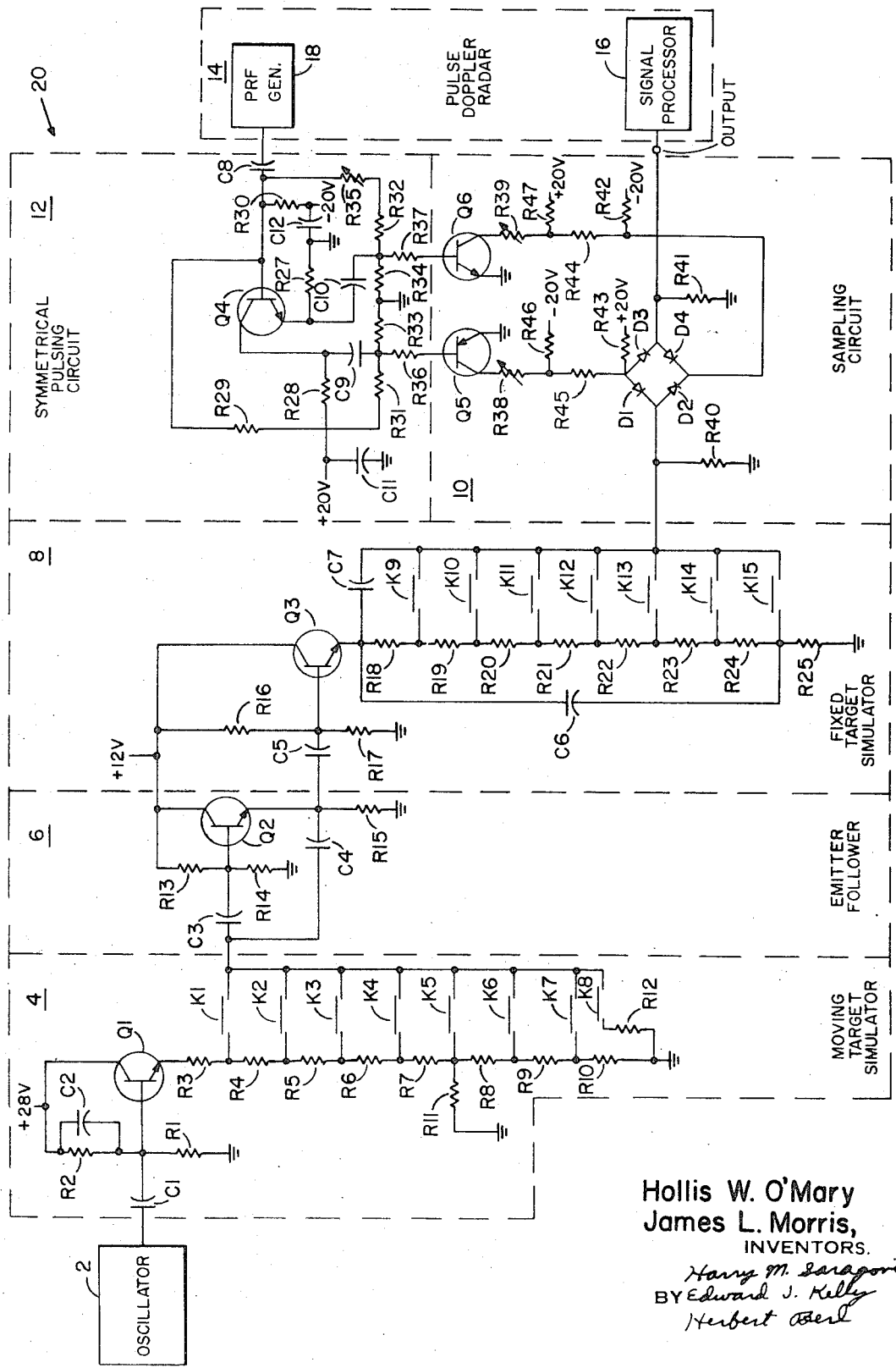

PULSE DOPPLER SIGNAL SIMULATOR

BACKGROUND OF THE INVENTION

There is a need for a device to check the performance of digital moving target indicators, analog delay line moving target indicators and analog range gated pulse doppler processing channels. The use of real radar targets would require an elaborate test set-up and test procedures. The test would be expensive and time consuming, requiring a number of operating personnel and complex stationary and moving targets. To get a desired known combination of clutter levels and target sizes would be extremely difficult if not impossible. Numerous simulators have been devised to generate signals which may be used to check the performance of radar equipment. Some processors require elaborate set-up procedures and a significant number of personnel to perform a test procedure.

Accordingly, it is an object of this invention to provide a signal simulator which provides preselected clutter levels and target sizes to a doppler radar.

Yet another object of this invention is to provide a simple, reliable device which will provide signals directly to the signal processing portion of a doppler radar.

SUMMARY OF THE INVENTION

A device for providing signals which may be connected to the signal processing portion of a doppler radar to test the performance of the signal processor. The device may provide any preselected clutter level or target sizes. An audio signal is supplied to stage 1. The target size, a.c. signal level, is chosen by the appropriate set of relay contacts and is connected to stage 3 via a buffer stage 2. A preselected clutter level is supplied by stage 3. The continuous target size and clutter level outputs are converted to video pulses in coincidence with the input pulses from the pulse repetition frequency (PRF) generator of the doppler radar. The video pulses are supplied to the processor of the radar.

BRIEF DESCRIPTION OF THE DRAWING

The single FIGURE drawing is a schematic diagram of the present invention.

DESCRIPTION OF THE PREFERRED EMBODIMENT

The present invention is designed to provide an output signal which may be connected directly to the signal processing portion of a pulse doppler radar to test the performance of the processor portion of the radar.

Simulator 20, comprises oscillator 2, moving target simulator 4, emitter follower (buffer) 6, fixed target simulator 8, sampling circuit 10, and symmetrical pulsing circuit 12 connected in series in the order recited. Sampling circuit 10 provides the desired simulated output which is used to test the signal processing portion 16 of pulse doppler radar 14. Symmetrical pulsing circuit 12 is responsive to the pulse repetition frequency (PRF) generator 18 of radar 14.

Simulator 20 provides to signal processing portion 16 of doppler radar 14 eight calibrated clutter levels ranging from no clutter, zero volts d.c. to 3.5 volts d.c. as the maximum clutter level. Seven calibrated target sizes are also provided ranging from 2 millivolts peak-to-peak a.c. to a maximum of 1 volt peak-to-peak a.c. Thus the signal processor's performance can be checked periodically, very simply and economically with a minimum of personnel and equipment, under a wide variety of input conditions. Since the inputs are standard calibrated values, exact measurements can be made of the processor's subclutter visibility and compared to the expected or previously measured performance.

Oscillator 2 provides an audio signal to moving target simulator 4. The target size, a.c. signal level, is chosen via contacts K1 through K8. Emitter follower 6 acts as a buffer and connects moving target simulator 4 to fixed target simulator 8. A predetermined clutter level is generated by fixed target simulator 8 via contacts K9 through K15. The signal generated by moving target simulator is passed by fixed target simulator 8 to sampling circuit 10. The output of fixed target simulator 8 is also connected to sampling circuit 10. Symmetrical pulsing circuit 12 is responsive to the PRF generator 18 of pulse doppler radar 14 and drives sampling circuit 10 in coincidence with the input pulses from the PRF generator. Sampling circuit 10 converts the input a.c. and d.c. continuous signals into video pulses. The amplitude of the pulses to the signal processor is controlled by the amplitude of the output signals from the fixed target simulator. The present invention provides a wide range of a.c. and d.c. signal levels which accurately represent the characteristic output of a pulse doppler radar receiver.

Referring to moving target simulator 4, capacitor C1 couples the output of oscillator 2 to the base of emitter follower transistor Q1. Resistors R1 and R2 provide biasing for transistor Q1. Capacitor C2 is connected across resistor R2 to suppress oscillation. Emitter resistors R3 through R10 comprise a divider network from which the output from the moving target simulator is taken via contacts K1 through K9. R11 provides increased impedance at low signal levels. R12 provides increased impedance at zero signal level when contact K8 is closed.

Moving target simulator 4 provides seven calibrated target sizes (K1–K7) and a zero signal level (K8). The appropriate contact or contacts are closed to achieve output a.c. signals from simulator 4 indicative of desired targets.

Emitter follower 6 is a buffer stage. Capacitor C3 acts as a coupling capacitor. Resistors R13 and R14 are biasing resistors and resistor R15 is a load resistor for transistor Q2. Capacitor C4 is used to suppress oscillation.

The purpose of fixed target simulator 8 is to provide a number of d.c. levels simulating different amounts of clutter. Capacitors C5 and C7 are used as coupling capacitors. Resistors R16 and R17 provide biasing for transistor Q3. Resistors R18 through R24 provide a d.c. voltage divider network while R25 acts as a load resistor. Capacitor C6 provides an a.c. bypass. Fixed target simulator 8 provides seven calibrated clutter levels via contacts K9 through K15 and a zero level (no contacts closed).

The purpose of symmetrical pulsing circuit 12 is to develop, from an input positive pulse train, symmetrical positive and negative pulses to control sampling circuit 10. Capacitors C8, C9 and C10 are coupling capacitors. Resistors R27 and R28 are load resistors. Resistors R29 through R34 are biasing resistors for modified emitter follower Q4. Variable resistor R35 provides symmetry adjustment. Resistors R36 and R37 are current limiting resistors and capacitors C11 and C12 are decoupling capacitors for the power supply.

The function of the sampling circuit 10 is to convert the a.c. and d.c. signals provided by moving target simulator 4 and fixed target simulator 8 into video pulses. Sampling circuit 10 is basically a normally open switch which receives its input signals from fixed target simulator 8. The switch is closed by the input pulses from symmetrical pulsing circuit 12. The output video pulses occur at the PRF rate and have an amplitude equal to the input signal amplitude received by the sampling circuit. Variable resistors R38 and R39 provide a means for adjusting the output amplitude of switching transistors Q5 and Q6. Resistors R40 and R41 are load resistors and resistors R42 through R47 are biasing resistors for switching diodes D1, D2, D3, and D4.

We claim:

1. A pulse doppler signal simulator comprising: means for selectively generating a predetermined a.c. signal indicative of a desired target; means for selectively generating a predetermined d.c. signal indicative of a desired clutter level; means for providing symmetrical positive and negative pulses; means for converting said a.c. and d.c. signals into video pulses having a pulse repetition rate coincident with said positive and negative pulses, said a.c. and d.c. signal generating means and said positive and negative pulse means being connected to said means for converting said a.c. and d.c. signals.

2. The device as set forth in claim 1 wherein said means for selectively generating a predetermined a.c. signal indicative of a desired target comprises a transistor having an oscillator capacitively coupled to its base; a plurality of resistors connected in series between the emitter of said transistor and ground; contact means for selectively connecting points between said resistors to said means for generating a d.c. signal, said transistor having its collector connected to a positive voltage.

3. The device as set forth in claim 1 wherein said means for selectively generating a predetermined d.c. signal indicative of a desired clutter level comprises a transistor having its base capacitively coupled to said means for generating an a.c. signal; a plurality of resistors connected in series between the emitter of said transistor and ground; a first capacitor connected in parallel with said plurality of resistors; contact means for selectively connecting points between said resistors to said means for converting said a.c. and d.c. signals into video pulses; a second capacitor connected between said emitter and said means for converting said a.c. and d.c. signals; said transistor having its collector connected to a positive voltage.

4. The device as set forth in claim 1 wherein said means for converting said a.c. and d.c. signals into video pulses comprises a first and second transistor; a first, second, third and fourth diode; said first diode having its cathode connected to the anode of said second diode and said means for generating a d.c. signal; said first diode having its anode resistively connected to a positive voltage, resistively connected to a negative voltage, resistively connected to the collector of said first transistor and connected to the anode of said third diode; said third diode having its cathode connected to an output terminal and to the anode of said fourth diode; said fourth diode having its cathode connected to the cathode of said second diode and resistively connected to a negative voltage, resistively connected to a positive voltage, and resistively connected to the collector of said second transistor; the emitters of said first and second transistors being connected to ground; the base of said first transistor and the base of said second transistor being connected to said means for providing symmetrical positive and negative pulses.

5. The device as set forth in claim 1 wherein said means for providing symmetrical positive and negative pulses comprises a transistor having a positive pulse train capacitively connected to its base; a first capacitor having a first side connected to the collector of said transistor and a second side connected to said means for converting and resistively connected to ground; a second capacitor having a first side connected to the emitter of said transistor and a second side connected to said means for converting and resistively connected to ground; a first and second resistor connected in series with said first capacitor, said resistors having a first end connected to said capacitor and a second end connected to a positive voltage; a third resistor, a third capacitor and a fourth resistor connected in series with said second capacitor in the order recited, a point between said third resistor and said third capacitor being connected to a negative voltage and resistively connected to said base, said fourth resistor being connected to said emitter; a fifth resistor connected between said base and said positive voltage.

6. The device as set forth in claim 5 wherein said positive pulse train is supplied by a pulse repetition frequency generator of a pulse doppler radar.

7. The device as set forth in claim 4 wherein said output terminal is connected to the signal processing portion of a pulse doppler radar and wherein said video signals are used to test the operation of said pulse doppler radar, said video signals being indicative of a predetermined target size and clutter level.

* * * * *